Patented Oct. 11, 1949

2,484,728

UNITED STATES PATENT OFFICE 2,484,728

WAX SEPARATION

Ivan E. Pattillo, Beaumont, Tex., assignor to Socony-Vacuum Oil Company, Incorporated, New York, N. Y., a corporation of New York No Drawing. Application March 18, 1947,
Serial No. 735,533

3 Claims. (Cl. 196—18)

This invention relates to a method of treating mixtures of paraffin wax and mineral oil of the nature of slack wax, foots oil and the like. More particularly, the present invention is directed to a process for separating high melting point paraffin waxes from slack wax.

In the usual manufacture of paraffin wax from petroleum, distillate stock is chilled generally to a temperature equal to or slightly below the pour point desired in the finished oil, and then is filter-pressed for the removal of the wax, giving liquid oil for lubricating oil stock and cakes of solid wax. In the art, this solid material resulting from a pressing of chilled paraffin distillate is known as slack wax. While the removal of liquid by pressure in the filtering operation is carried as far as is feasible, it is, nevertheless, incomplete. The solid slack wax still contains a considerable quantity of oil, often 20 to 40 per cent, and must be subjected to further treatment to remove the residual oil and to obtain waxes of substantially high melting points.

Heretofore, high melting point paraffin waxes have generally been made by sweating or solvent-pressing of slack waxes. The former method comprises placing the slack wax in a closed chamber and gradually raising the temperature in said chamber, thereby causing oil contained in the wax cake to sweat or drip therefrom. The oil so obtained, known as foots oil, is returned to the wax distillate or is resweated. In order to obtain a high melting point wax, the sweating operation usually is repeated on the wax obtained from the initial sweating. This practice requires a considerable amount of recycling and hence renders the operation relatively time-consuming. The yields of desired wax, moreover, are generally low because of the rejection of a considerable quantity of high melting point waxes with the foots oil.

The solvent-pressing method requires dilution of the slack wax with a solvent, usually naphtha, chilling the resulting solution and passing the chilled solution through filter presses. The solvent-pressing methods, while generally yielding larger quantities of wax than the sweating methods, are rather expensive, requiring the use of refrigerating equipment to maintain low pressing temperatures and distillation apparatus to recover solvent from the resulting product. Also, due to the solubility of the wax in the particular solvent employed, a certain proportion of high melting wax undesirably passes during the pressing operation into the filtrate.

It has now been discovered, in accordance with the present invention, that the aforesaid disadvantages in separation of high melting point waxes from slack waxes can be overcome by liquifying the slack wax, cooling the liquified wax to a temperature at which the wax crystals are formed and pressing the resulting slurry of wax crystals and oil at said temperature to yield a wax cake of substantially high melting point. Since initial crystal formation of the wax will take place at a fairly high temperature, usually between about 50° F. and about 100° F., the pressing operation will generally be carried out in this temperature range. By carrying out the filtering or pressing of the slack wax at high temperatures and in an undiluted state, a rapid method for obtaining improved yields of high melting point waxes has been found. This method can be carried out in a fraction of the time required by a sweating operation to obtain a paraffin wax of similar melting point characteristics. The method of this invention likewise is less expensive than the conventional solvent-pressing processes heretofore employed, giving an improved yield of high melting point paraffin wax in comparison with said processes, as will be shown hereinafter.

It is accordingly an object of the present invention to provide an efficient, rapid method for separating a high melting point wax from slack wax. Another object is to provide a method of obtaining a substantially improved yield of high melting point paraffin wax without necessitating an involved recycling operation. A still further object is to afford a comparatively inexpensive procedure for isolating high melting paraffin waxes from slack waxes.

These and other objects which will be recognized by those skilled in the art are attained in accordance with the present invention, wherein slack wax is heated to a temperature above its melting point, cooled to a temperature at which wax crystals form, and then filter-pressed at said temperature.

The various slack waxes require somewhat different temperatures for their liquification, but the temperature is always above the melting point of the slack wax, usually by about 25° F. or more as determined by the ASTM procedure. The liquified slack wax is carefully cooled in accordance with the present invention to yield a slurry of wax crystals in oil. The rate of cooling the liquified slack wax will generally be between about 2 and about 3 minutes per degree Fahrenheit. However, under certain conditions, it is desirable to employ a faster cooling rate of one degree Fahrenheit per minute or greater. Faster cooling rates result in the formation of smaller wax crystals, thereby reducing the time required for filtration.

Under all conditions, however, the liquified slack wax is cooled from a temperature above its melting point to a temperature at which wax crystals are formed. This later temperature will usually lie between about 50° F. and about 100° F. and more generally above about 80° F. in this range, depending upon the quantity of oil present in the slack wax and the desired melting point of the resultant wax. The liquified slack wax accordingly should be cooled to a temperature not greater than that at which initial wax crystal formation takes place. The slurry of wax and oil is then pressed through conventional filter presses at said relatively high temperatures to yield valuable high melting point waxes. Pressure applied during the wax pressing operation gradually increases as the slurry of wax and oil is passed through the press from an initial pressure slightly above atmospheric to a substantially high pressure of the order of 400 pounds per square inch or greater. Slack waxes can be pressed, in accordance with this invention, at temperatures in the range of 50° F. to 100° F., since the temperature is sufficiently high to reduce the viscosity of the oil to the desired degree, thereby permitting the recovery of high melting point waxes during the pressing operation. The foots oil resulting from the pressing operation has a lower wax content than the original slack wax and may be reprocessed by employing conventional methods. Likewise, the present invention contemplates refiltering of the wax cake obtained for further diminution of its oil content.

The following examples will serve to illustrate the method of this invention without limiting the same:

Example 1

Slack wax of 115° F. melting point and 28 per cent by weight oil content from East Texas crude was heated to a temperature of about 140° F. and completely liquified. The liquified wax was then cooled at a rate of 2° F. per minute to a temperature of 85° F. and the resulting slurry of wax and oil was pressed at this temperature through a conventional plate and frame press. The wax cake so obtained had a melting point of 128.4° F. and an oil content of 3.6 per cent by weight. The filtrate had a pour test of 86° F. and an oil content of 54 per cent by weight. The yield of the wax cake was 57 per cent, based on the weight of charge.

Wax of similar characteristics obtained by using the conventional solvent-pressing procedure required dilution of the original slack wax with about an equal volume of naphtha and pressing at a temperature of 40° F. The yield of wax cake under these conditions was never greater than 54 per cent, based on the weight of charge.

Example 2

Foots oil obtained from a mixture of slack waxes had a pour point of 96° F. and an oil content of 44.9 per cent by weight. This foots oil was heated to a temperature above its pour point and cooled at a rate of 2° F. per minute to a temperature of 72° F. The slurry of oil and wax was filter-pressed at this temperature to yield a wax cake having a melting point of 114.3° F. and an oil content of 3.5 per cent by weight. The yield of the wax cake was 32 per cent, based on the weight of charge.

Wax of similar characteristics obtained by using the conventional solvent-pressing procedure required the use of an equal volume of naphtha and pressing at a temperature of 35° F. The yield of wax cake under these conditions was less than 30 per cent, based on the weight of charge.

I claim:

1. A rapid method of separating a high melting point paraffin wax from a sweatable oil-wax mixture, which comprises melting the oil-wax mixture, cooling the molten mixture in a substantially quiescent state, at a rate of at least one degree Fahrenheit per minute to a temperature at which wax crystals are initially formed and immediately filtering the resulting slurry of oil and wax at said temperature by passing the same through a press under a pressure gradually increasing from substantially atmospheric to the order of 400 pounds per square inch to yield a wax cake of high melting point.

2. A rapid method of separating a high melting point paraffin wax from slack wax, which comprises, as the only separation steps, melting the slack wax, cooling the molten wax, in a substantially quiescent state, at a rate of at least one degree Fahrenheit per minute to a temperature between about 80° F. and 100° F. and immediately filtering the resulting slurry of oil and wax at said temperature by passing the same through a press under a pressure gradually increasing from substantially atmospheric to the order of 400 pounds per square inch to yield a wax cake of high melting point.

3. A rapid method of separating a high melting point paraffin wax from a sweatable oil-wax mixture, which comprises melting the oil-wax mixture, cooling the molten mixture in a substantially quiescent state, at a rate of at least one degree Fahrenheit for every 2 to 3 minutes cooling time to a temperature of about 50° F .and about 100° F. and filtering the resulting slurry of oil and wax at said temperature by passing the same through a press under a pressure gradually increasing from substantially atmospheric to the order of 400 pounds per square inch to yield a wax cake of high melting point.

IVAN E. PATTILLO.

REFERENCES CITED

The following references are of record in the file of this patent:

UNITED STATES PATENTS

| Number | Name | Date |
|---|---|---|
| 1,128,494 | Opl | Feb. 16, 1915 |
| 1,685,008 | Souther et al. | Sept. 18, 1928 |
| 1,998,464 | Perkins et al. | Apr. 23, 1935 |
| 2,062,356 | Farr et al. | Dec. 1, 1936 |
| 2,273,153 | Stratford | Feb. 17, 1942 |

Certificate of Correction

Patent No. 2,484,728                                                 October 11, 1949

IVAN E. PATTILLO

It is hereby certified that error appears in the printed specification of the above numbered patent requiring correction as follows:

Column 4, line 48, for the word "of" read *between*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*